United States Patent
Moyerman et al.

(10) Patent No.: US 9,977,953 B2
(45) Date of Patent: May 22, 2018

(54) SENSOR NETWORK FOR TRICK CLASSIFICATION

(71) Applicant: Intel Corporation, Santa Clara, CA (US)

(72) Inventors: Stephanie Moyerman, Phoenix, AZ (US); Tyler Fetters, Hillsboro, OR (US); James Brian Hall, Tucson, AZ (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 14/978,336

(22) Filed: Dec. 22, 2015

(65) Prior Publication Data
US 2017/0173389 A1    Jun. 22, 2017

(51) Int. Cl.
| | |
|---|---|
| *A63F 9/24* | (2006.01) |
| *G06K 9/00* | (2006.01) |
| *A63K 3/00* | (2006.01) |
| *A63B 69/16* | (2006.01) |
| *B62J 99/00* | (2009.01) |

(52) U.S. Cl.
CPC ............ *G06K 9/00342* (2013.01); *A63K 3/00* (2013.01); *A63B 69/16* (2013.01); *A63B 2220/12* (2013.01); *A63B 2220/35* (2013.01); *A63B 2220/40* (2013.01); *A63B 2220/62* (2013.01); *A63B 2225/50* (2013.01); *B62J 2099/0013* (2013.01)

(58) Field of Classification Search
None
See application file for complete search history.

(56) References Cited

U.S. PATENT DOCUMENTS

| | | | |
|---|---|---|---|
| 2013/0085713 A1* | 4/2013 | Rogel | ...................... H04R 1/02 702/141 |
| 2013/0274635 A1 | 10/2013 | Coza et al. | |

(Continued)

FOREIGN PATENT DOCUMENTS

| | | |
|---|---|---|
| WO | WO-2010025294 A1 | 3/2010 |
| WO | WO-2013074939 A2 | 5/2013 |
| WO | 2017112239 | 6/2017 |

OTHER PUBLICATIONS

Grant, Will, "Intel's Latest Sensor Can Learn New Tricks", Vice Sports, (Sep. 26, 2015), 6 pgs.

(Continued)

*Primary Examiner* — Paul A D'Agostino
(74) *Attorney, Agent, or Firm* — Schwegman Lundberg & Woessner, P.A.

(57) ABSTRACT

Systems and techniques for a sensor network for trick classification are described herein. A first data stream may be received from a first sensor array affixed to a first free-moving body of a sporting device. A second data stream may be received from a second sensor array affixed to a second free-moving body of the sporting device. A trick region of a predetermined length of the first data stream corresponding with an occurrence of a trick may be determined using data from the first data stream. The trick may be classified using a first set of data from the first data stream corresponding with the trick region and a second set of data from the second data stream. The second set of data may be obtained by aligning the trick region of the first data stream with the second data stream.

21 Claims, 6 Drawing Sheets

(56) References Cited

U.S. PATENT DOCUMENTS

2013/0326561 A1* 12/2013 Pandey ................ G11B 27/031
    725/58
2014/0074265 A1   3/2014 Arginsky et al.
2014/0257743 A1   9/2014 Lokshin et al.
2015/0247727 A1   9/2015 Opas et al.
2015/0335949 A1  11/2015 Lokshin et al.

OTHER PUBLICATIONS

Russell, Nick, "New BMX Sensor Technology Set to Shake Up the Extreme Sports Industry", Follow Innovation, [Online]. Retrieved from the Internet: <URL: http://followinnovation.com/new-bmx-sensar-technology-set-to-shake-up-the/>, (Mar. 9, 2015), 4 pgs.

Szucher, Krisztian, et al., "Sensor-augmented connected experiences that blends physical and virtual.", ArcSecond, [Online]. Retrieved from the Internet: <URL: https://www.f6s.com/arcsecond>, (Accessed: Oct. 4, 2016), 5 pgs.

Weiss, C. C, et al., "Trace sensor tracks your tricks and airs for skate, snow and surf", New Atlas, [Online]. Retrieved from the Internet: <URL: http://newatlas.com/trace-sensor-skate-snow-surf/28836/>, (Aug. 27, 2013), 4 pgs.

"International Application Serial No. PCT/US2016/063270, International Search Report dated Feb. 10, 2017", 3 pgs.

"International Application Serial No. PCT/US2016/063270, Written Opinion dated Feb. 10, 2017", 8 pgs.

* cited by examiner

SENSOR NETWORK FOR TRICK CLASSIFICATION

BACKGROUND

Classification of complex motions from captured sensor data may be a complex and computationally costly procedure. While techniques exist for quantifying simple actions, such as step counting, more complex actions may still lack accuracy in quantification. Further, the quantification of simple actions may involve analyzing to a single number (e.g. a number of steps). Algorithms describing the quality of step or length of stride may use algorithms that may be power hungry, as much more data may be analyzed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
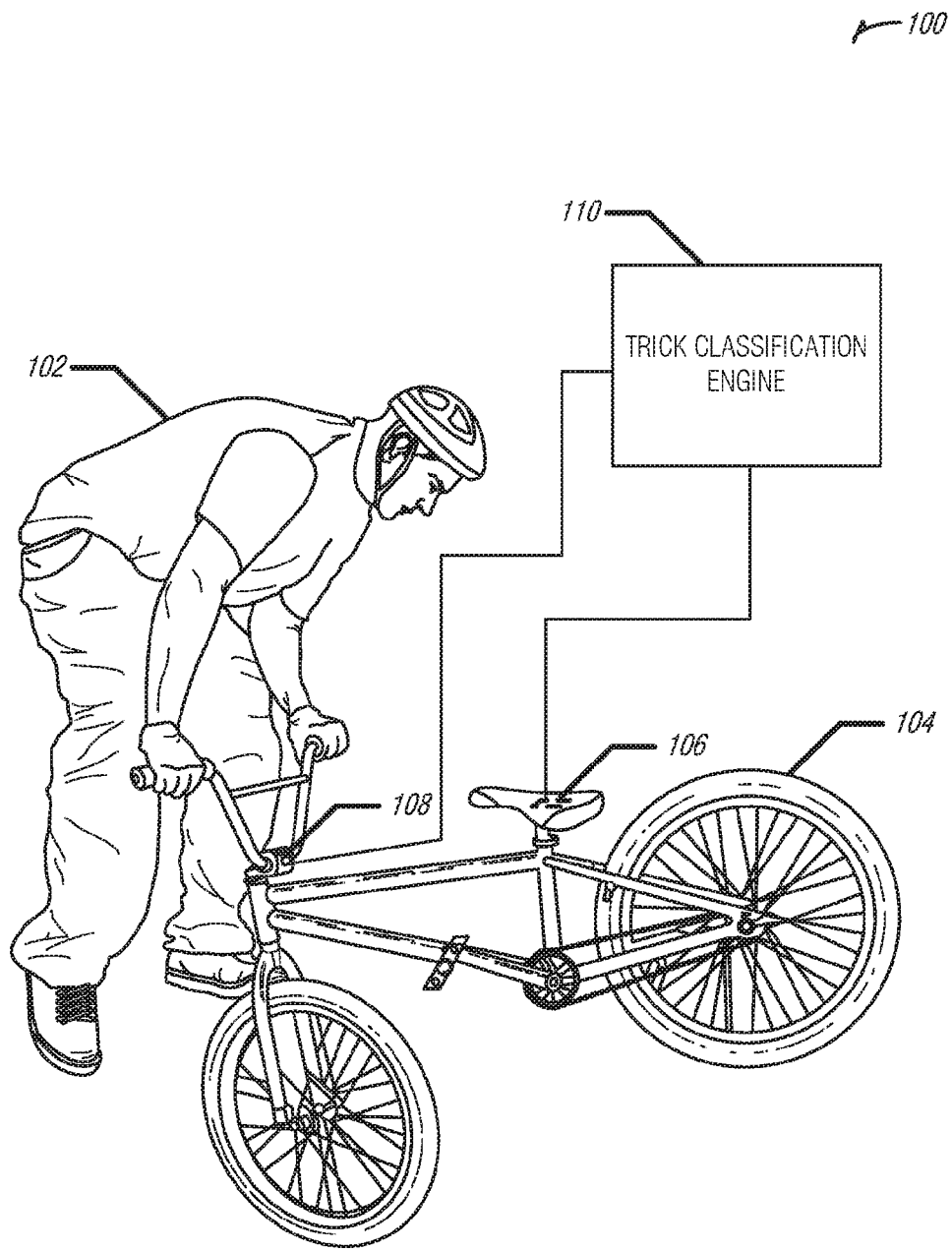
FIG. 1 illustrates an environment including a trick classification engine, according to an embodiment.

Motion classification may be complicated by the fact that complex motions are not always performed by a single rigid body. In particular, in action sports, there may be two or more bodies in free motion at a given time. In skateboarding, the rider may move independently of the skateboard. In BMX biking, the handlebars may spin independently of the frame of the bike. Algorithms may not exist for classifying and quantifying these multi-faceted motions. With the growing popularity of these sports and the high-level competitions to which they belong (e.g., X Games, Olympics, etc.) automatic metrics for classification, quantization, and scoring for judging may become increasingly important.

Systems and techniques are disclosed for a real-time trick classification and quantization using temporal domain samples from two independent sensor arrays (e.g., pucks) each containing a variety of sensors (e.g., an accelerometer, a gyroscope, a magnetometer, etc.). The multiple independent sensor array data may be streamed together and fused in real-time. Several thresholding metrics may be used to determine a trick event and duration. The trick may classified and quantified based on a set of features computed from the temporal domain samples.

The present subject matter may classify and quantify action sports data in real time by fusing the sensor data from multiple sensor arrays each including a plurality of sensors. Thus, multiple sets of independent sensor data may allow more accurate classification of complex motion combinations (e.g., tricks). For example high accuracy (e.g., >90%) was achieved using eight unique flatland BMX tricks and fourteen unique vertical ramp BMX tricks with a fraction of the available nodes (e.g., <50%) on a pattern recognition hardware block. The present subject matter may increase computational efficiency as very little computation may be used to extract features from the temporal sensor data. The present subject matter may increase power efficiency by mapping classifications to generic low-cost pattern recognition hardware block. The present subject matter may be scalable and may be utilized for many different tricks across multiple sports.

In some examples, a user may mount one of the two sensor arrays to the underside of a bike seat and may mount the other sensor array to the front side of the bike handlebars. The classified tricks may be performed along with normal riding actions. In an example, a trick region may be identified in which a trick may have been performed. For example, tricks may be identified within a one second region for flatland BMX riding and within a 2.8 second region centered about the trick action for vertical ramp BMX riding. Tricks outside a training set may be rejected based on a distance threshold on a classifier. Tricks that may be classified in the training set may be transmitted to a smartphone or other data logging system (e.g., computer, mobile device, tablet, etc.). The present subject matter may perform with a high accuracy for flatland BMX tricks (e.g., ~99%) and vertical ramp BMX tricks (e.g., ~96%) based on two-fold cross-validation. A benefit of this approach may be that the same techniques for trick classification and statistics calculations may be applied to both flatland BMX riding and vertical ramp BMX riding. Modifications may be performed to the trick detection and segmentation and different training data may be used for flatland BMX than may be used for vertical ramp BMX, but the rest of the algorithm may remain same. In some examples, metrics such as speed, height, landing quality, and spin/flip angles may be computed and transmitted along with the trick data.

It will be understood that the present subject matter may be utilized in a variety of situations including, but not limited to, automated coaching, enhanced entertainment and gamification, scoring, judging, and real time trick competitions for athletes at different locations worldwide.

FIG. 1 illustrates an environment 100 including a trick classification engine 110, according to an embodiment. The environment 100 may include a user 102 (e.g., flatland BMX rider, vertical ramp BMX rider, etc.) of a sporting device 104 (e.g., bike, etc.). The sporting device 104 may have a first sensor array 106 (e.g., a collection of sensors such as an accelerometer, a gyroscope, a magnetometer, etc.) affixed to a first free-moving body (e.g., a bike seat representing the movement of the bike frame, etc.) of the sporting device 104. The sporting device 104 may have a second sensor array 108 affixed to a second free-moving body (e.g., a handlebar, a handlebar stem, etc. representing movement independent of the first moving body, etc.) of the sporting device 104. Each of the sensor arrays may contain a variety of sensors. Examples of sensors that may be included in each sensor array include, but are not limited to, an accelerometer, a gyroscope, a magnetometer, a barometer, a global positioning (GPS) receiver, or an ultra-wideband radio transceiver. The first sensor array 106 and the second sensor array 108 may be communicatively coupled to a trick classification engine 110. The first sensor array 106 and the second sensor array 108 may communicate with the trick classification engine 110 using a variety of wireless communication technologies. Examples of wireless communication technologies that may be employed include, but are not limited to, Bluetooth, Wi-Fi, 900 MHz radio, ultra-wideband radio. Although the sporting device 104 illustrated in FIG. 1 is a bike, it is understood that any apparatus with at least two independent freely moving bodies are included in the scope of the sporting device, such as, for example, a kick scooter, motocross bike, quad bike, or the like.

BMX riders may perform a variety tricks consisting of a series of complex movements. During each trick different portions of the bike make move independently of each other. For example, the user 102 may be performing a trick called a foot jam tail whip in which the frame body of the sporting device 104 rotates 360 degrees around the handlebar body of the sporting device 104. During this trick the user 102 may remain in position with the handlebar body of the sporting device 104. It may be difficult to capture the independent movement data of each of these independent bodies from a single sensor array. The techniques described herein use a network of sensor arrays attached to independently moving bodies of a sporting device to allow accurate detection of complex tricks.

In an example, the trick classification engine 110 may be used to identify and classify a trick performed by the user 102. The trick classification engine 110 is described in greater detail in the description of FIG. 3.

Figure 2:
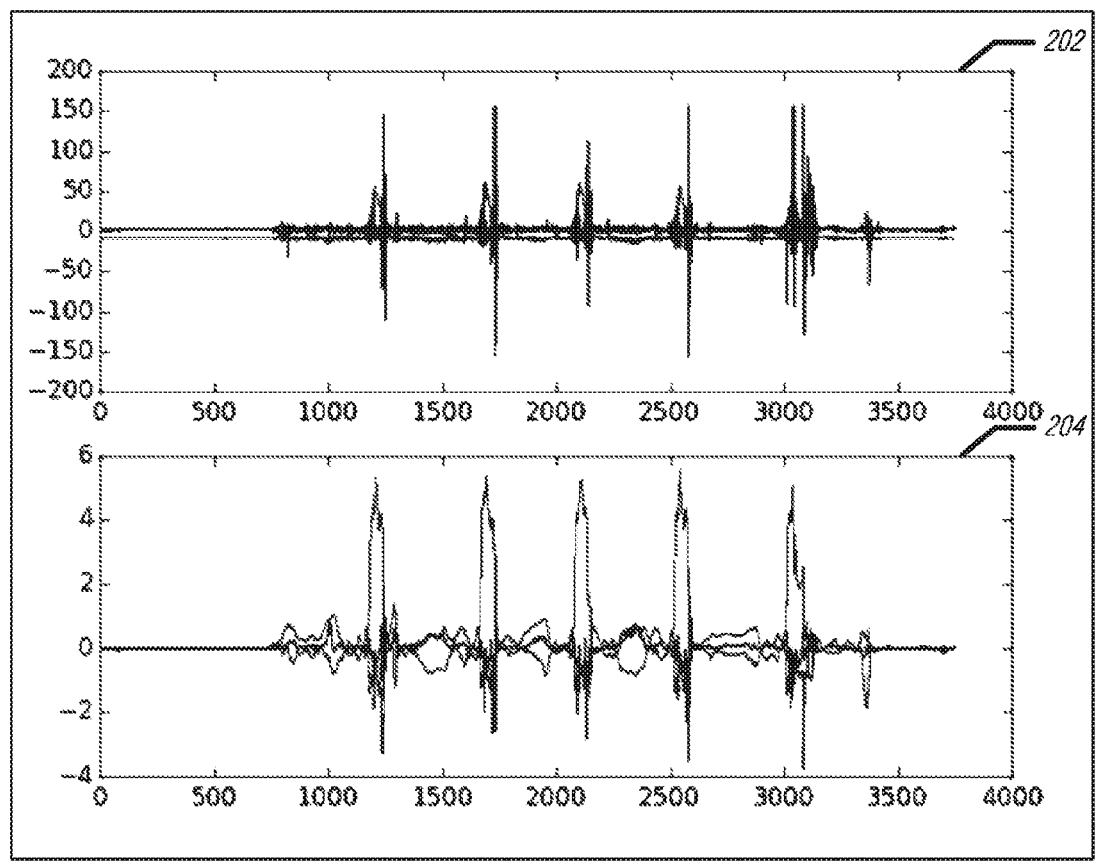
FIG. 2 illustrates a graph of an example data stream from an accelerometer and a gyroscope of a sensor array, according to an embodiment.

In some examples, a first data stream may be received by the trick classification engine 110 from the first sensor array 106 affixed to a first free-moving moving body of the sporting device 104. In an example, raw 3-axis accelerometer, gyroscope, and magnetometer data may be collected from the first sensor array 106. In an example, the data may be collected at a sampling frequency of F=50 Hz. For example, the first sensor array 106 may be placed under the seat of the sporting device 104. The sporting device seat may be free to rotate in all three axes. An example data stream including accelerometer data and gyroscope data is shown in FIG. 2.

In some examples, a second data stream may be received by the trick classification engine 110 from the second sensor array 108 affixed to a second free-moving body of the sporting device 104. In an example, raw 3-axis accelerometer, gyroscope, and magnetometer data may be collected from the second sensor array 108. In an example, the data may be collected at a sampling frequency of F=50 Hz. In an example, the second sensor array 108 may be mounted to a handlebar of the sporting device 104. The sporting device handlebar may be constrained in certain degrees of freedom by a sporting device frame, but may be free to rotate about a single axis.

In some examples, a trick region of a predetermined length of the first data stream corresponding with an occurrence of a trick may be identified by the trick classification engine 110 using data from the first data stream. The majority of BMX time, both flatland riding and vertical ramp riding, may be spent in normal bike riding motions or in waiting. Trick regions may need to be identified and/or extracted from the rest of the data stream.

In an example, the first sensor array 106 affixed to the bike seat may be utilized to compute the squared-magnitude $(=x^2+y^2+z^2)$ of the accelerometer and gyrometer sensor values a plurality of time stamps. This may compress six dimensional measurements per timestamp into two rotationally and translationally invariant measurements. Invariance may be important for BMX because it may remove dependency on an initial orientation of the bike at the start of the trick.

At each timestamp, a five-point moving average and moving standard deviation may be computed for each point in the first data stream. For flatland riding, a set of thresholds may be determined using logged field data for each of four magnitude metrics including: mean for the magnitude of the accelerometer data, standard deviation for the magnitude of the accelerometer data, mean for the magnitude of the gyroscope data, and standard deviation for the magnitude of the gyroscope data. A trick region may be identified when each of these thresholds are simultaneously breached.

Identifying a trick region in vertical ramp BMX riding may be more complicated. Trick regions in flatland BMX riding may be segmented by their sharp, approximately 1 second long regions in the in the accelerometer and gyrometer data streams. The rest of the data stream may be relatively flat compared to the trick region. Vertical ramp tricks, however, may be embedded within data that is noisier compared to the natural motion of a rider in a half-pipe. A half-pipe is a structure resembling a portion of a large pipe cut in half in which riders ride down the incline of one side of the ramp to gain momentum to ride up and over the over side to perform a trick in the air. Data regions in the data stream while the rider is on the ramp and is still, waiting for his or her turn, or an appropriate time to enter the ramp, may be considered to correspond with the relatively flat region as indicated for flatland BMX riding. The data stream may become noisy as soon as the rider enters the ramp. The noise may last for the entire duration of the rider's run (e.g., 10 seconds, etc.). Identifying the trick region may be further complicated by the fact that the rider need not always perform a trick (e.g., the rider may bail out of the trick, exit the ramp early, etc.).

In an example, identifying the trick region in the first data stream may include identifying when a rider has entered a vertical ramp. In an example, the mean of the magnitude of the gyrometer measurements may be computed at one second intervals. If the previous second's value is below a given threshold (e.g., 0.5 rad$^2$/s$^2$, etc.) and the current second's value is above the given threshold, the rider may be identified as having entered the ramp. In an example, for each second thereafter, the rider may be identified as continually riding in the ramp while the one second mean continues to exceed a slightly lower threshold (e.g., 0.2 rad$^2$/sec$^2$). In an example, the thresholds may be based on empirical data.

In an example, the natural motion of the rider through the pipe may be used to identify the trick region in the first data stream. For example, the rider may start on one side of the ramp and may ride to the other side and then back. In an example, a trick may be performed over a flat tabled portion in the center of the ramp on the rider's path back to start. In an example, it may be determined that a trick occurs between five seconds and eight seconds based on a pattern of movement after the rider enters the ramp. In an example, running mean of the magnitude of the accelerometer data of the first data stream may be analyzed for maximums eight seconds after the rider has entered the vertical ramp. In an example, the maximum in the trick region may correspond to the rider landing the trick. In an example, the trick region may be identified around the maximum.

In an example, upon identifying the trick region, a start of the trick region may be identified. In an example, upon identifying the trick region, an end of the trick region may be identified. Both flatland BMX tricks and vertical ramp BMX tricks may vary in duration (e.g., up to approximately 1.5 seconds). Data from the first data stream and the second data stream may be buffered so that activity before the movement giving rise to the identification of the trick region may be analyzed during trick classification. In an example, a rolling buffer may constantly collect the first data stream and the second data stream. In an example, the rolling buffer may collect three seconds of the first data stream and the second data stream. In an example, the rolling buffer may include nine axes of sensor data from the second sensor array 108 and the mean of the rolling magnitudes of accelerometer data and gyroscope data included in the second data stream. In an example, the rolling buffer may include raw accelerometer data and gyrometer data included in the first data stream.

In an example, data from the first data stream and data from the second data stream received after the identification of a trick region may be added to the rolling buffer. For example, another 30 data points (e.g., 0.6 seconds) may be allowed to buffer after the trick region has been identified which may allow the rider to finish the trick being performed. In an example, no additional data may be added to the rolling buffer if it is determined that the trick was completed within a time period (e.g., 8 seconds). In an example, a first point in the rolling buffer where the running accelerometer mean and running gyroscope mean exceed independent thresholds may be labeled as the start of the trick, in an example, a last point in the rolling buffer where the running accelerometer mean and running gyroscope mean exceed the same thresholds may be labeled as the end of the trick.

In some examples, the trick may be classified by the trick classification engine 110 using a first set of data from the first data stream corresponding with the trick region and a second set of data from the second data stream, the second set of data may be obtained by aligning the trick region of the first data stream with the second data stream. In an example, the first data stream and the second data stream may be synchronized (e.g., using a time marker, etc.).

In an example, data from the first data stream and the second data stream collected between the start and the end of the trick may be compressed into six machine learning features. In an example, a maximum rotation and a sum of rotation about the spin axis may be calculated from the second data set corresponding with the trick region. In an example, a sum and a sum of the absolute value of the gyrometer data along each axis may be calculated from the data collected within the trick region of the first data stream. The features may be evaluated against a set of training data. In an example, the features may be evaluated using pattern matching to determine a trick model of the set of training data. In an example, the features may be compared with a set of pre-trained trick reference features and the trick may be classified using a nearest neighbor classification. In an example, an L1 distance from a best fit node of the set of training data may be computed and one or more identified tricks above a certain threshold distance may be eliminated (e.g., identified as a false detection).

In some examples, one or more trick parameters relevant to the specific trick performed may be computed by the trick classification engine 110 using the set of training data, a first set of data of the first data stream corresponding with the trick region, and a second set of data of the second data stream corresponding with the trick region. Examples of parameters that may be computed include, but are not limited to, total spin of the first sensor array 106, total flip of the first sensor array 106, total spin of the second sensor array 108, air time of the first sensor array 106 (e.g., where all points in the magnitude of the gyroscope are below a threshold), landing impact of the first sensor array 106 (e.g., maximum value of the mean of the running magnitude of the accelerometer), maximum spin of the first sensor array 106, and maximum flip for the first sensor array 106. For example, if the trick performed is classified as a 360, where the rider and bike spin 360 degrees in the air, then the air time, spin degree, landing impact, and max spin speed may be computed and output for display. In another example, if the rider spins the handlebars while performing a regular jump (e.g., "Handlebar Spin," "Bar Spin," etc.) then the air time, handlebar spin degree, and landing impact may computed and output for display. Some non-limiting examples of the parameters include:

Total Spin and Flip: Integration of the gyrometer data from the first sensor array 106 during the trick region for the respective axis.

Total Handlebar Spin: Integration of the gyrometer data from the second sensor array 108 during the trick region for the respective axis Air Time: Integrated amount of time when the gyrometer data from the first sensor array is "smooth", where all points in the magnitude data are below a certain threshold.

Landing Impact: The maximum value of the mean of the running magnitude of the accelerometer from the first sensor array during the trick region.

Max Spin/Flip speed: The maximum of the gyrometer data from the first sensor array during the trick region for the respective axis In some examples, the trick classification engine 110 may be placed in a training mode to generate a set of training data. In an example, the set of training data may be stored in a database of BMX tricks.

In some examples, a set of training data for flatland BMX tricks may be collected by the trick classification engine 110 using two different riders. In an example, each training rider may be riding the sporting device 104 including the first sensor array 106 and the second sensor array 108. Each rider may perform a training trick a number of times (e.g., 10-20 times) in a semi-rapid succession. In an example, data from the first sensor array 106 and the second sensor array 108 may be collected from performance of a total number of performances of the training trick (e.g., 20-40). The data may be used to generate the set of training data. In an example, the data may be collected at a frequency of 50 Hz.

In some examples, a set of training data for ramp riding may be collected by the trick classification engine 110 using three different training riders. In an example, each training rider may be riding the sporting device 104 including the first sensor array 106 and the second sensor array 108. Each rider may perform a training trick a number of times (e.g., 10-20 times) in a semi-rapid succession. In an example, data from the first sensor array 106 and the second sensor array 108 may be collected from performance of a total number of performances of the training trick (e.g., 30-60). The data may be used to generate the set of training data. In an example, the data may be collected at a frequency of 50 Hz.

In an example, features may be identified from the first data stream corresponding with the trick region and the second data stream corresponding with the trick region. In an example, six features are identified from the first data set and the second data set. In an example, the features may be evaluated against each other for self-similarity using the L1 distance. For example, if the training riders collectively performed a handlebar spin ten time, respective of the ten data sets may be evaluated against each other to determine common data characteristics for the handlebar spin trick. In an example, tricks above a certain L1 distance threshold in the evaluation may be eliminated from the set of training data (e.g., flagged as false detection, an unsuccessful trick attempt, etc.). In an example, data collected during the training mode may be split into a set of training data and a set of test data. In an example, 80% of the data may be identified as the set of training data and 20% of the data may be identified as the set of test data. In an example, a classification algorithm may be generated using the set of training data and the set of test data.

In an example, a set of training data corresponding with flatland BMX tricks may be validated by running a classification algorithm in real time against active riding from one of the two riders who provided the training data. In an example, a set of training data corresponding with vertical ramp BMX tricks may be validated by running a classification algorithm in real time against the three riders who provided the training data and an additional rider who did not provide the training data. The addition of additional data from riders that did not provide the training data may improve the accuracy of trick classification.

FIG. 2 illustrates a graph of an example data stream 200 from an accelerometer and a gyroscope of a sensor array, according to an embodiment. The example data stream may include acceleration data collected from the accelerometer of the sensor array represented by an acceleration graph 202 and rotational data collected from the gyroscope of the sensor array represented by a rotational graph 204. The acceleration graph 202 illustrates a series of peaks and valleys in the acceleration data over a period of time. The rotational graph 204 illustrates a series of peaks and valleys in the rotational data over the same period of time. The example set of data illustrates a bike rider completing five tricks. This may be indicated by the five distinct areas of motion indicated on the acceleration graph 202 and the rotational graph 204 during time periods 1000-1500, 1500~1900, 1900~2250, 2250~2750, and 2750~3250. The example data stream may be used as described in the description of FIG. 1 to identify a trick region and classify a trick performed over a period of time.

Figure 3:
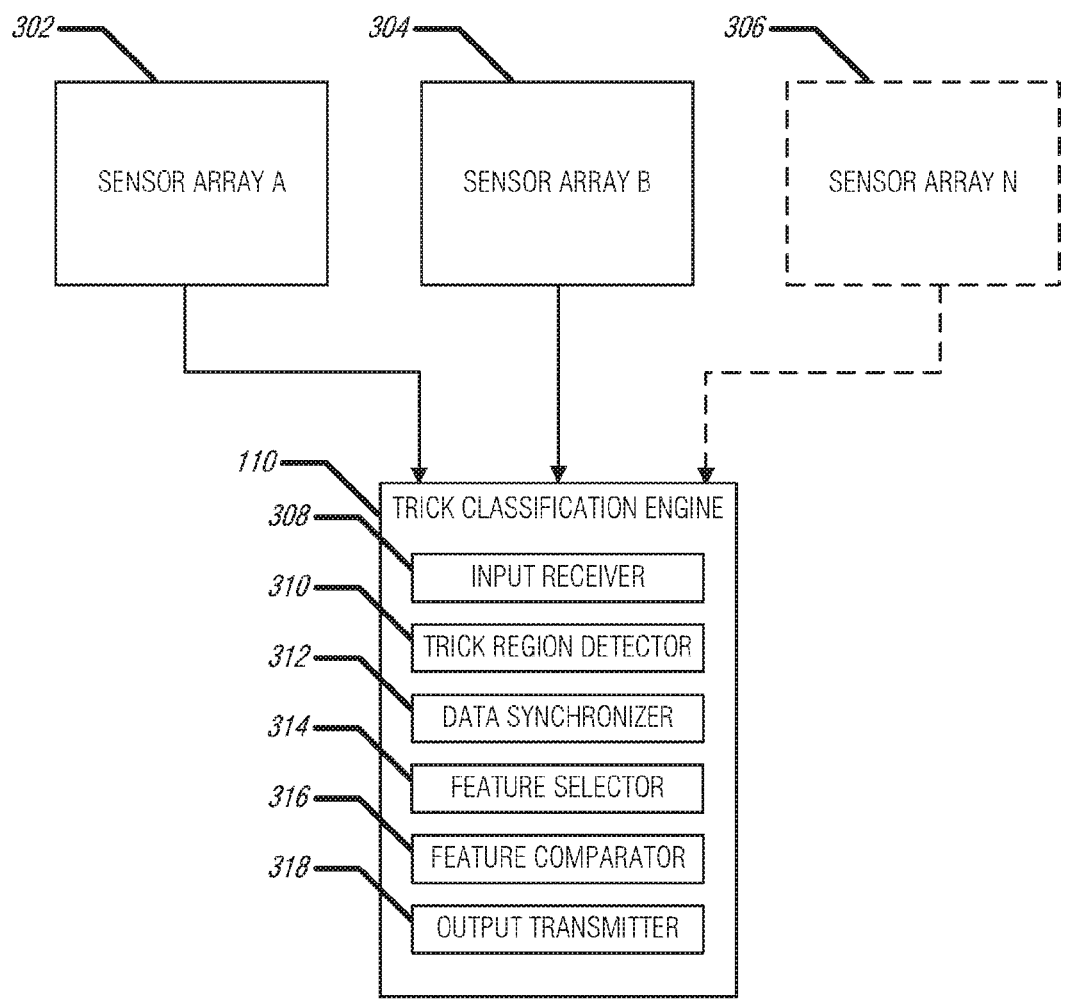
FIG. 3 illustrates an example of a system for a sensor network for trick classification, according to an embodiment.

FIG. 3 illustrates an example of a system 300 for a sensor network for trick classification, according to an embodiment. The system 300 may include a sensor array A 302 and a sensor array B 304 communicatively coupled (e.g., via wireless network, etc.) to a trick classification engine 110. In some embodiments, additional sensor array(s) (e.g., sensor array N 306) may be communicatively coupled to the trick classification engine 110. Each sensor array may include a variety of sensors including, by way of example and not limitation, an accelerometer, a gyroscope, a magnetometer, a barometer, a global positioning (GPS) receiver, an ultra-wideband radio transceiver.

The trick classification engine 110 may provide similar functionality as the trick classification engine 110 as described in FIG. 1. The trick classification engine 110 may include an input receiver 308 for receiving data from the sensor arrays, a trick region detector 310 for identifying a trick region in the received data, a data synchronizer 312 for synchronizing data (e.g., aligning data using a time pointer, data marker, etc.) across multiple data streams collected from the sensor arrays (e.g., a data stream collected from sensor array A 302 and a data stream collected from sensor array B 304, etc.), a feature selector 314 for selecting machine learning features from the data to be used in trick classification, a feature comparator 316 for evaluating the selected features against a set of features in a set of training data to classify a trick, and an output transmitter 318 for outputting data (e.g., to a display device, messaging system, etc.).

The input receiver 308 may receive a first data stream from a first sensor array (e.g., sensor array A 302) affixed to a first free-moving body of a sporting device and may receive a second data stream from a second sensor array (e.g., sensor array B 304) affixed to a second free-moving body of the sporting device. In an example, each of the first data stream and the second data stream may be collected at a frequency of 50 Hz. For example, the sensor array A 302 may be affixed to the underside of a bicycle seat and the sensor array B 304 may be affixed to a handlebar of a bicycle.

In some embodiments, the input receiver 308 man receive a third data stream from a third sensor array (e.g., sensor array N 306) affixed to a user of the sporting device. Some tricks may be performed in which the rider's body position may be a component of the trick. For example, a rider may perform a "no hander" in which the rider releases the grip on the handlebars in mid-air. In this case, the movement of the bike during the trick may be indistinguishable from a normal jump. Affixing a third sensor array may improve detection accuracy by providing a third data stream including the rider's movement. The third data stream may be included for use in the identification and classification of the trick.

The first data stream may include movement data corresponding to the bicycle seat and the second data stream may include movement data corresponding to the handlebar. For example, a bike rider may spin the handlebars while the bicycle is in the air and the first data stream may include movement data indicating the orientation of the bicycle seat and the movement of the bicycle seat along 3-axes and the second data set may include movement data indicating the movement of the handlebars around an axis such as the head tube of the bicycle frame.

In some example, the first data stream and the second data stream may be received in a training mode. The training mode may allow the data to be used in developing a set of training data.

The trick region detector 310 identify a trick region of a pre-determined length of the first data stream corresponding with an occurrence of a trick using data from the first data stream. In an example, a rotational magnitude may be determined over a period of time. In an example, the rotational magnitude may be a sum of a square of a first axis rotational magnitude, a square of a second axis rotational magnitude, and a square of a third axis rotational magnitude. An average rotational magnitude and a rotational magnitude standard deviation may be calculated for the rotation magnitude over the period of time. In an example, the trick region may include a start time and an end time. In an example, the start time may correspond to a point where the average rotational magnitude exceeds a threshold rotational magnitude in the first data stream. In an example, the end time may correspond to a later point where the average rotational magnitude exceeds the threshold rotational magnitude.

In an example, an acceleration magnitude may be determined over a period of time. In an example, the acceleration magnitude may be a sum of a square of a first axis acceleration magnitude, a square of a second axis acceleration magnitude, and a square of a third axis acceleration magnitude. An average acceleration magnitude and an acceleration magnitude standard deviation may be calculated for the acceleration magnitude over the period of time. In an example, the trick region may include a start time and an end time. In an example, the start time may correspond to a point where the average acceleration magnitude exceeds an acceleration threshold magnitude in the first data stream. In an example, the end time may correspond to a later point where the average acceleration magnitude exceeds the threshold acceleration magnitude.

The data synchronizer 312 may synchronize the first data stream and the second data stream. In an example, a set of trick data may be generated by synchronizing the second data stream with the first data stream using the trick region. In an example, the trick data generated by the data synchronizer module includes data from the third data stream synchronized with the first data stream and the second data stream using the trick region. In an example, the first data stream and the second data stream may be synchronized using the start time of the trick region and the end time of the trick region of the first data stream. For example, the trick region of the first data stream may have a start time of 1000 milliseconds and an end time of 1500 milliseconds and a set of data may be accessed between 100 milliseconds and 1500 milliseconds from each of the first data stream and the second data stream. In an example, a set of data may be generated from data from the trick region of the first data stream and a synchronized portion of the second data stream.

The feature selector 314 may determine a plurality of features from the trick region of the first data stream and a synchronized portion of the second data stream. In an example, a set of machine learning features may be selected from the trick data generated by the data synchronizer 312. In an example, data from the first data stream and the second data stream collected between the start and the end of the trick region may be compressed into six machine learning features. In an example, a maximum rotation and a sum of rotation about the spin axis may be calculated from the second data set corresponding with the trick region. In an example, a sum and a sum of the absolute value of pyrometer data along each axis may be calculated from the data collected within the trick region of the first data stream.

The feature comparator 316 may classify the trick using a first set of data from the first data stream corresponding with the trick region and a second set of data from a portion of the second data stream corresponding with the trick region. In an example, the trick may be classified using the set of machine learning features selected by the feature selector 314. In some embodiments, a third set of data from a third data stream corresponding with the trick region may be used in classifying the trick. In an example, the plurality of features selected by the feature selector 314 may be evaluated to a set of training data to classify the trick. In an example, the features may be evaluated using pattern matching to determine a trick model of the set of training data. In an example, the features may be compared with a set of pre-trained trick reference features and the trick may be classified using a nearest neighbor classification. In an example, an L1 distance from a best fit node of the set of training data may be computed and one or more identified tricks above a certain threshold distance may be eliminated.

The feature comparator 316 may calculate a parameter using the plurality of features determined by the feature selector 314. In some examples, one or more trick parameters relevant to the classified trick may be computed by the feature comparator 316 using the set of training data, a first set of data of the first data stream corresponding with the trick region, and a second set of data of the second data stream corresponding with the trick region. Examples of parameters that may be computed include, but are not limited to, total spin of the first sensor array, total flip of the first sensor array, total spin of the second sensor array, air time of the first sensor array (e.g., where all points in the magnitude of the gyroscope are below a threshold), landing impact of the first sensor array (e.g., maximum value of the mean of the running magnitude of the accelerometer), maximum spin of the first sensor array, and maximum flip of the first sensor array. For example, if the trick performed is classified as a 360, where the rider and bike spin 360 degrees in the air, then the air time, spin degree, landing impact, and max spin speed may be computed and output for display. In another example, if the rider spins the handlebars while performing a regular jump (e.g., "Handlebar Spin," "Bar Spin," etc.) then the air time, handlebar spin degree, and landing impact may computed and output for display.

In an example, the feature comparator 316 may be placed in a training mode. The training mode may allow the comparison of multiple sets of features (e.g., from multiple performances of a specific trick, etc.) to be compared to determine common characteristics. In some examples, the classification may be performed manually to establish the set of training data.

The output transmitter 318 may output data calculated by the trick classification engine 110. In an example, the output transmitter 318 may output parameters calculated for the trick by the feature comparator 318 to a display device. In an example, the output transmitter 318 may output parameters calculated for the trick by the feature comparator to a messaging system (e.g., email, SMS, etc.). In an example, the output transmitter 318 may output a graphical representation of the first data stream and the second data stream to a display device. In an example, the output transmitter 318 may output to a display device an animated representation of the sporting device using the first set of data of the first data stream corresponding with the trick region, and the second set of data of the second data stream corresponding with the trick region.

While flatland BMX and vertical ramp BMX were used as exemplary uses of the present subject matter, it will be understood that the present subject matter may be used in many action sports in which tricks or other complex movements occur. Examples may include, but are not limited to, skiing, snowboarding, wakeboarding, and skateboarding. For example, the first sensor array may be affixed to a skier's right ski and the second sensor array may be affixed to the skier's left ski. For example, in wakeboarding, the first sensor array may be affixed to a wakeboard and the second sensor array may be affixed to a tow rope. For example, in skateboarding, the first sensor array may be affixed to a skateboard and the second sensor array may be affixed to a skateboarder's belt.

Figure 4:
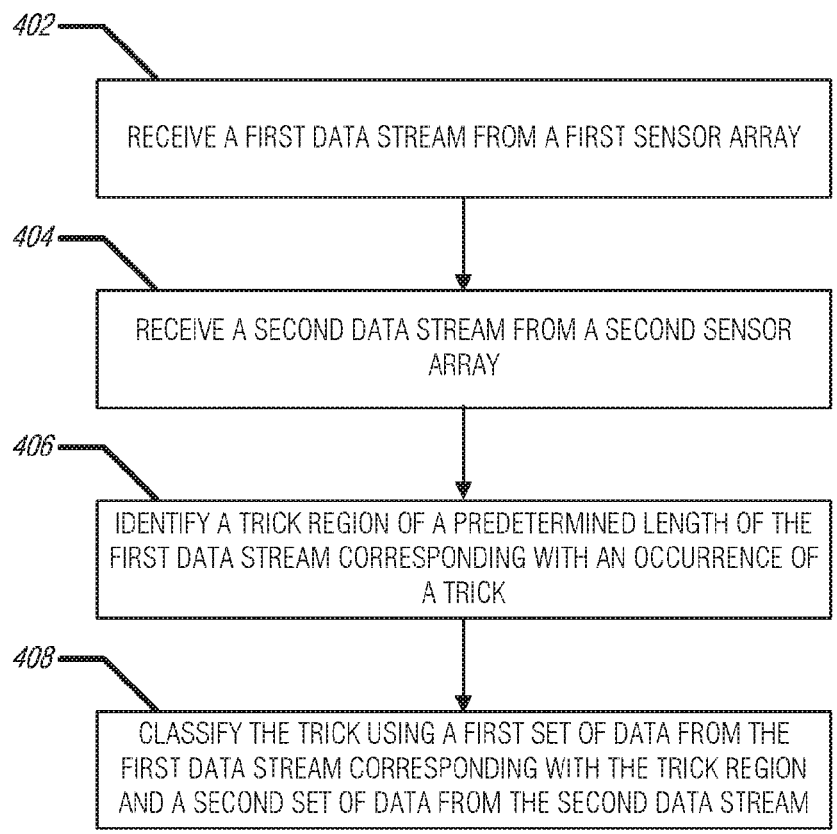
FIG. 4 illustrates an example of a method for a sensor network for trick classification, according to an embodiment.

FIG. 4 illustrates an example of a method 400 for a sensor network for trick classification, according to an embodiment.

At operation 402, method 400 may receive a first data stream from a first sensor array affixed to a first free-moving body of a sporting device at a computing device. In an example, the first sensor array may include a gyroscope and an accelerometer, and the first data stream may include gyroscope data and accelerometer data. In an example, the sporting device may be a bicycle. In an example, the first free-moving body may be a bicycle seat. In an example, the first data stream may be received at a frequency of 50 Hz.

At operation 404, the method 400 may receive a second data stream from a second sensor array affixed to a second free-moving body of the sporting device. In an example, the second sensor array may include a gyroscope and an accelerometer, and the second data stream may include gyroscope data and accelerometer data. In an example, the second free-moving body may be a bicycle handlebar. In an example, the first data stream may be received at a frequency of 50 Hz.

At operation 406, the method 400 may identify a trick region of a predetermined length of the first data stream corresponding with an occurrence of a trick using data from the first data stream. In an example, a trick marker may be identified in the first data stream. In an example, the first data stream may be segmented into a trick region, the trick region may have a start time before the trick marker and an end time after the trick marker. In an example, segmenting the first data stream may include obtaining a fixed amount of the first data stream occurring before the trick marker and obtaining a fixed amount of the first data stream occurring after the trick marker.

In some examples, a rotation magnitude over a period of time may be determined, an average rotation magnitude and a rotation magnitude standard deviation for the rotation magnitude over the period of time may be calculated, and the data used in identifying the trick region of the first data stream may include the average rotation magnitude and the rotation magnitude standard deviation. In an example, the rotation magnitude may be a sum of a square of a first axis rotation magnitude for the period of time, a square of a second axis rotation magnitude for the period of time, and a square of a third axis rotation magnitude for the period of time. In an example, a start of the trick region corresponding to a first point in the first data stream at which the average rotation magnitude exceeds a threshold may be identified, and an end of the trick region corresponding to a second point in the first data stream at which the average rotation magnitude exceeds the threshold may be identified. In an example, the second point may be subsequent the first point in the first data stream.

In some examples, an acceleration magnitude over a period of time may be determined, an average acceleration magnitude and an acceleration magnitude standard deviation for the acceleration magnitude over the period of time may be calculated, and the data used in identifying the trick region of the first data stream may include the average acceleration magnitude and the acceleration magnitude standard deviation. In an example, the acceleration magnitude may be a sum of a square of a first axis acceleration magnitude for the period of time, a square of a second axis acceleration magnitude for the period of time, and a square of a third axis acceleration magnitude for the period of time. In an example, a start of the trick region corresponding to a first point in the first data stream at which the average acceleration magnitude exceeds a threshold may be identified, and an end of the trick region corresponding to a second point in the first data stream at which the average acceleration magnitude exceeds the threshold may be identified. In an example, the second point may be subsequent the first point in the first data stream.

At operation 408, the method 400 may classify the trick using a first set of data from the first data stream corresponding with the trick region and a second set of data from the second data stream. The second set of data may be obtained by aligning the trick region of the first data stream with the second data stream. In an example, the trick region with a corresponding synchronized second data stream of a second sensor array may be analyzed to classify a trick.

Figure 5:
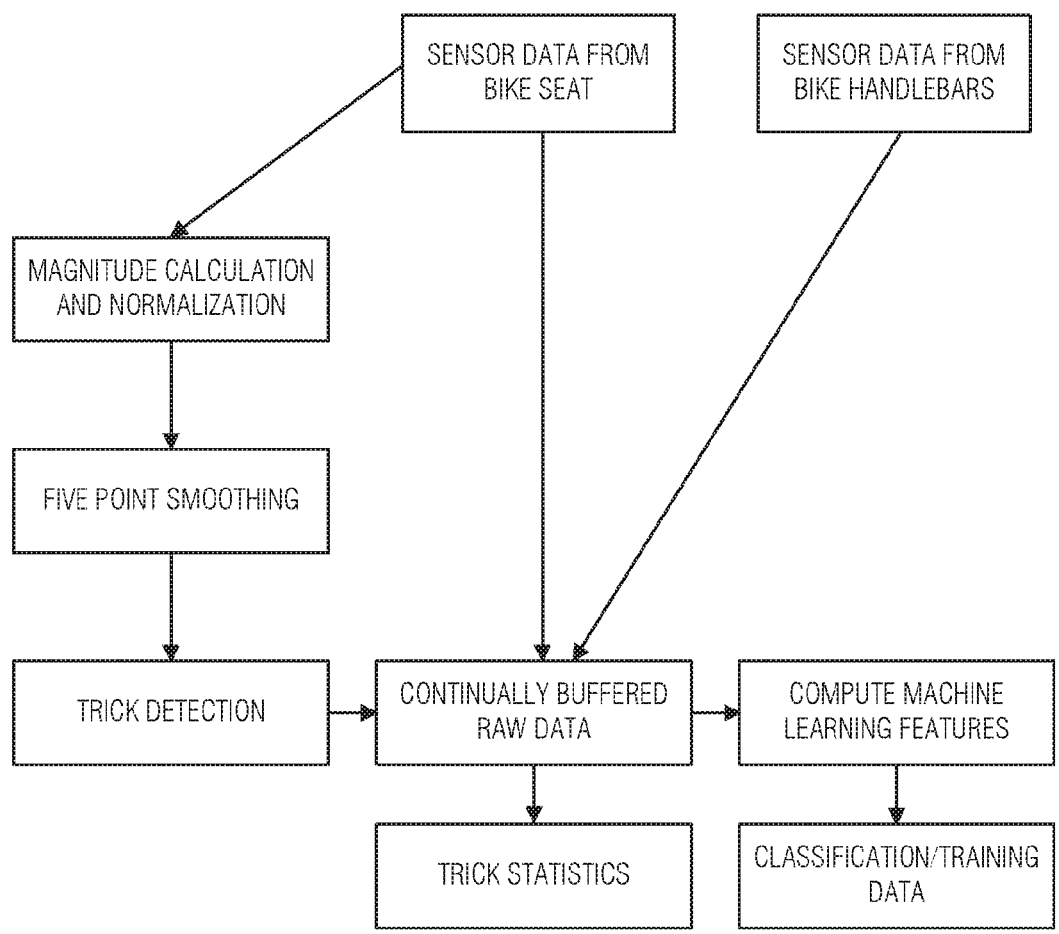
FIG. 5 illustrates a flowchart of an example of a process and data flow for a sensor network for trick classification, according to an embodiment.

In some examples, a first plurality of features for the first set of data may be determined and a second plurality of features for the second set of data may be determined, and classifying the trick may include comparing the first plurality of features and the second plurality of features to a set of training data. In an example, the comparing may use nearest neighbor classification. In some examples, a parameter may be calculated using the first plurality of features and the second plurality of features, and the parameter may be displayed on a display device. In an example, the parameter may be at least one of an air time, a spin degree, a landing impact, and a max spin speed. In some examples, the first data stream and the second data stream may be received in a training mode, and the data used to classify the trick may be added to a set of training data FIG. 5 illustrates a flowchart of an example of a process and data flow 500 for a sensor network for trick classification, according to an embodiment. The process and data flow 500 may be used in some implementations of the present subject matter as described in FIGS. 1-4.

Figure 6:
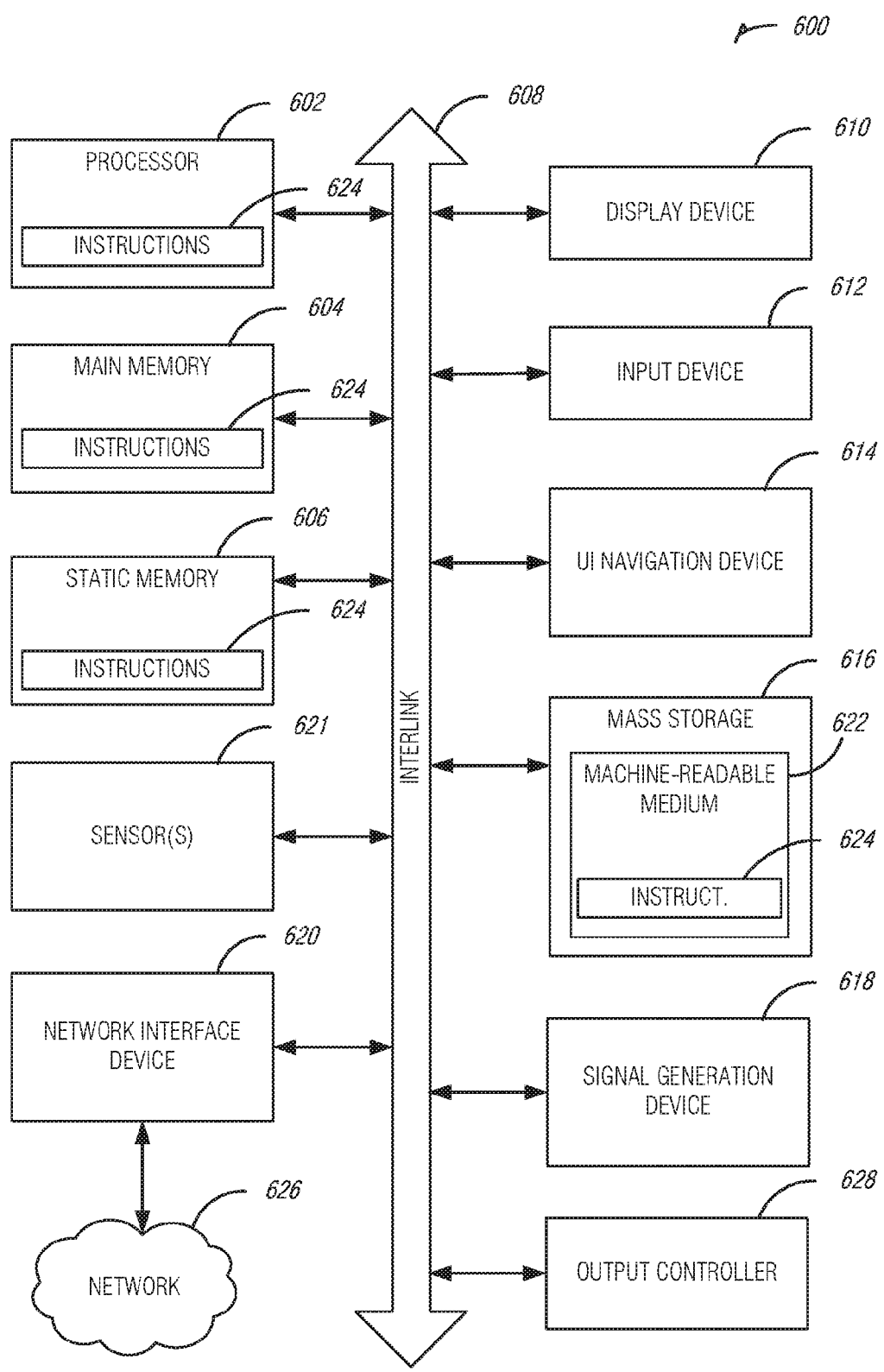
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof) a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a computer apparatus to implement a sensor network for trick classification, the computer apparatus comprising: a processor; and a memory storing instructions that, when executed by the processor, configure the computing apparatus to: receive, at a computing device, a first data stream from a first sensor array affixed to a first free-moving body of a sporting device; receive a second data stream from a second sensor array affixed to a second free-moving body of the sporting device; identify, using data from the first data stream, a trick region of a predetermined length of the first data stream corresponding with an occurrence of a trick; and classify the trick using a first set of data from the first data stream corresponding with the trick region and a second set of data from the second data stream, the second set of data obtained by aligning the trick region of the first data stream with the second data stream.

In Example 2, the subject matter of Example 1 optionally includes, further comprising instructions, which when executed by the processor, cause the processor to: receive a third data stream from a third sensor array affixed to a user of the sporting device; and wherein classifying the trick uses a third set of data from the third data stream obtained by aligning the trick region of the first data stream with the third data stream.

In Example 3, the subject matter of any one or more of Examples 1-2 optionally include, wherein the first sensor array includes a gyroscope and an accelerometer, and wherein the first data stream includes gyroscope data and accelerometer data.

In Example 4, the subject matter of any one or more of Examples 1-3 optionally include, further comprising instructions, which when executed by the processor, cause the processor to: determine a rotation magnitude over a period of time; calculate an average rotation magnitude and a rotation magnitude standard deviation for the rotation magnitude over the period of time; and wherein the data used in identifying the trick region of the first data stream includes the average rotation magnitude and the rotation magnitude standard deviation.

In Example 5, the subject matter of Example 4 optionally includes, wherein the rotation magnitude is a sum of a square of a first axis rotation magnitude for the period of time, a square of a second axis rotation magnitude for the period of time, and a square of a third axis rotation magnitude for the period of time.

In Example 6, the subject matter of any one or more of Examples 4-5 optionally include, wherein the instructions to identify the trick region of the first data stream comprises instructions, which when executed by the processor, cause the processor to: identify a start of the trick region corresponding to a first point in the first data stream at which the average rotation magnitude exceeds a threshold; and identify an end of the trick region corresponding to a second point in the first data stream at which the average rotation magnitude exceeds the threshold, the second point being subsequent the first point in the first data stream.

In Example 7, the subject matter of any one or more of Examples 1-6 optionally include, further comprising instructions, which when executed by the processor, cause the processor to: determine an acceleration magnitude over a period of time; calculate an average acceleration magnitude and an acceleration magnitude standard deviation for the acceleration magnitude over the period of time; and wherein the data used to identify the trick region of the first data stream includes the average acceleration magnitude and the acceleration magnitude standard deviation.

In Example 8, the subject matter of Example 7 optionally includes, wherein the acceleration magnitude is a sum of a square of a first axis acceleration magnitude for a period of time, a square a second axis acceleration magnitude for the period of time, and a square a third axis acceleration magnitude for the period of time.

In Example 9, the subject matter of any one or more of Examples 7-8 optionally include, wherein the instructions to identify the trick region of the first data stream comprises instructions, which when executed by the processor, cause the processor to: identify a start of the trick region corresponding to a first point in the data stream during a period of time before the occurrence of the trick at which the average acceleration magnitude exceeds a threshold; and identify an end of the trick region corresponding to a second point in the data stream during a period of time before the occurrence of the trick at which the average acceleration magnitude exceeds the threshold.

In Example 10, the subject matter of any one or more of Examples 1-9 optionally include, further comprising instructions, which when executed by the processor, cause the processor to: determine a first plurality of features for the first set of data and a second plurality of features for the second set of data; and wherein to classify the trick includes comparing the first plurality of features and the second plurality of features to a set of training data.

In Example 11, the subject matter of Example 10 optionally includes, further comprising instructions, which when executed by the processor, cause the processor to: calculate a parameter using the first plurality of features and the second plurality of features; and display the parameter on a display device.

In Example 12, the subject matter of Example 11 optionally includes, wherein the parameter is at least one of an air time, a spin degree, a landing impact, and a max spin speed.

In Example 13, the subject matter of any one or more of Examples 10-12 optionally include, wherein the comparing uses nearest neighbor classification.

In Example 14, the subject matter of any one or more of Examples 1-13 optionally include, further comprising instructions, which when executed by the processor, cause the processor to: receive the first data stream and the second data stream in a training mode; and add the data used to classify the trick to a set of training data.

In Example 15, the subject matter of any one or more of Examples 1-14 optionally include, wherein the sporting device is a bicycle.

In Example 16, the subject matter of any one or more of Examples 1-15 optionally include, wherein the first free-moving body is a bicycle seat.

In Example 17, the subject matter of any one or more of Examples 1-16 optionally include, wherein the second free-moving body is a bicycle handlebar.

In Example 18, the subject matter of any one or more of Examples 1-17 optionally include, wherein each of the first data stream and the second data stream received at a frequency of 50 Hz.

Example 19 is a computer-readable storage medium to implement a sensor network for trick classification, the computer-readable storage medium including instructions that when executed by a computer, cause the computer to: receive, at a computing device, a first data stream from a first sensor array affixed to a first free-moving body of a sporting device; receive a second data stream from a second sensor array affixed to a second free-moving body of the sporting device; identify, using data from the first data stream, a trick region of a predetermined length of the first data stream corresponding with an occurrence of a trick; and classify the trick using a first set of data from the first data stream corresponding with the trick region and a second set of data from the second data stream, the second set of data obtained by aligning the trick region of the first data stream with the second data stream.

In Example 20, the subject matter of Example 19 optionally includes, further comprising instructions that when executed by a computer, cause the computer to: receive a third data stream from a third sensor array affixed to a user of the sporting device; and wherein the instructions to classify the trick further includes instructions to use a third set of data from the third data stream obtained by aligning the trick region of the first data stream with the third data stream.

In Example 21, the subject matter of any one or more of Examples 19-20 optionally include, wherein the first sensor array includes a gyroscope and an accelerometer, and wherein the first data stream includes gyroscope data and accelerometer data.

In Example 22, the subject matter of any one or more of Examples 19-21 optionally include, further comprising instructions that when executed by a computer, cause the computer to: determine a rotation magnitude over a period of time; calculate an average rotation magnitude and a rotation magnitude standard deviation for the rotation magnitude over the period of time; and wherein the data used to identify the trick region of the first data stream includes the average rotation magnitude and the rotation magnitude standard deviation.

In Example 23, the subject matter of Example 22 optionally includes, wherein the rotation magnitude is a sum of a square of a first axis rotation magnitude for the period of time, a square of a second axis rotation magnitude for the period of time, and a square of a third axis rotation magnitude for the period of time.

In Example 24, the subject matter of any one or more of Examples 22-23 optionally include, wherein the instructions to identify the trick region of the first data stream comprises instructions that when executed by a computer, cause the computer to: identify a start of the trick region corresponding to a first point in the first data stream at which the average rotation magnitude exceeds a threshold; and identify an end of the trick region corresponding to a second point in the first data stream at which the average rotation magnitude exceeds the threshold, the second point being subsequent the first point in the first data stream.

In Example 25, the subject matter of any one or more of Examples 19-24 optionally include, further comprising instructions that when executed by a computer, cause the computer to: determine an acceleration magnitude over a period of time; calculate an average acceleration magnitude and an acceleration magnitude standard deviation for the acceleration magnitude over the period of time; and wherein the data used in identifying the trick region of the first data stream includes the average acceleration magnitude, and the acceleration magnitude standard deviation.

In Example 26, the subject matter of Example 25 optionally includes, wherein the acceleration magnitude is a sum of a square of a first axis acceleration magnitude for a period of time, a square a second axis acceleration magnitude for the period of time, and a square a third axis acceleration magnitude for the period of time.

In Example 27, the subject matter of any one or more of Examples 25-26 optionally include, wherein the instructions to identify the trick region of the first data stream comprises instructions that when executed by a computer, cause the computer to: identify a start of the trick region corresponding to a first point in the data stream during a period of time before the occurrence of the trick at which the average acceleration magnitude exceeds a threshold; and identify an end of the trick region corresponding to a second point in the data stream during a period of time before the occurrence of the trick at which the average acceleration magnitude exceeds the threshold.

In Example 28, the subject matter of any one or more of Examples 19-27 optionally include, further comprising instructions that when executed by a computer, cause the computer to: determine a first plurality of features for the first set of data and a second plurality of features for the second set of data; and wherein the instructions to classify the trick includes instructions that when executed by a computer, cause the computer to compare the first plurality of features and the second plurality of features to a set of training data.

In Example 29, the subject matter of Example 28 optionally includes, further comprising instructions that when executed by a computer, cause the computer to: calculate a parameter using the first plurality of features and the second plurality of features; and display the parameter on a display device.

In Example 30, the subject matter of Example 29 optionally includes, wherein the parameter is at least one of an air time, a spin degree, a landing impact, and a max spin speed.

In Example 31, the subject matter of any one or more of Examples 28-30 optionally include, wherein the comparing uses nearest neighbor classification.

In Example 32, the subject matter of any one or more of Examples 19-31 optionally include, further comprising instructions that when executed by a computer, cause the computer to: receive the first data stream and the second data stream in a training mode; and add the data used to classify the trick to a set of training data.

In Example 33, the subject matter of any one or more of Examples 19-32 optionally include, wherein the sporting device is a bicycle.

In Example 34, the subject matter of any one or more of Examples 19-33 optionally include, wherein the first free-moving body is a bicycle seat.

In Example 35, the subject matter of any one or more of Examples 19-34 optionally include, wherein the second free-moving body is a bicycle handlebar.

In Example 36, the subject matter of any one or more of Examples 19-35 optionally include, wherein each of the first data stream and the second data stream received at a frequency of 50 Hz.

Example 37 is a method to implement a sensor network for trick classification, the method comprising: receiving, at a computing device, a first data stream from a first sensor array affixed to a first free-moving body of a sporting device; receiving a second data stream from a second sensor array affixed to a second free-moving body of the sporting device; identifying, using data from the first data stream, a trick region of a predetermined length of the first data stream corresponding with an occurrence of a trick; and classifying the trick using a first set of data from the first data stream corresponding with the trick region and a second set of data from the second data stream, the second set of data obtained by aligning the trick region of the first data stream with the second data stream.

In Example 38, the subject matter of Example 37 optionally includes, further comprising: receiving a third data stream from a third sensor array affixed to a user of the sporting device; and wherein the classifying the trick further includes using a third set of data from the third data stream obtained by aligning the trick region of the first data stream with the third data stream.

In Example 39, the subject matter of any one or more of Examples 37-38 optionally include, wherein the first sensor array includes a gyroscope and an accelerometer, and wherein the first data stream includes gyroscope data and accelerometer data.

In Example 40, the subject matter of any one or more of Examples 37-39 optionally include, further comprising: determining a rotation magnitude over a period of time; calculating an average rotation magnitude and a rotation magnitude standard deviation for the rotation magnitude over the period of time; and wherein the data used in identifying the trick region of the first data stream includes the average rotation magnitude and the rotation magnitude standard deviation.

In Example 41, the subject matter of Example 40 optionally includes, wherein the rotation magnitude is a sum of a square of a first axis rotation magnitude for the period of time, a square of a second axis rotation magnitude for the period of time, and a square of a third axis rotation magnitude for the period of time.

In Example 42, the subject matter of any one or more of Examples 40-41 optionally include, wherein identifying the trick region of the first data stream comprises: identifying a start of the trick region corresponding to a first point in the first data stream at which the average rotation magnitude exceeds a threshold; and identifying an end of the trick region corresponding to a second point in the first data stream at which the average rotation magnitude exceeds the threshold, the second point being subsequent the first point in the first data stream.

In Example 43, the subject matter of any one or more of Examples 37-42 optionally include, further comprising: determining an acceleration magnitude over a period of time; calculating an average acceleration magnitude and an acceleration magnitude standard deviation for the acceleration magnitude over the period of time; and wherein the data used in identifying the trick region of the first data stream includes the average acceleration magnitude, and the acceleration magnitude standard deviation.

In Example 44, the subject matter of Example 43 optionally includes, wherein the acceleration magnitude is a sum of a square of a first axis acceleration magnitude for a period of time, a square a second axis acceleration magnitude for the period of time, and a square a third axis acceleration magnitude for the period of time.

In Example 45, the subject matter of any one or more of Examples 43-44 optionally include, wherein identifying the trick region of the first data stream comprises: identifying a start of the trick region corresponding to a first point in the data stream during a period of time before the occurrence of the trick at which the average acceleration magnitude exceeds a threshold; and identifying an end of the trick region corresponding to a second point in the data stream during a period of time before the occurrence of the trick at which the average acceleration magnitude exceeds the threshold.

In Example 46, the subject matter of any one or more of Examples 37-45 optionally include, further comprising: determining a first plurality of features for the first set of data and a second plurality of features for the second set of data; and wherein the classifying the trick includes comparing the first plurality of features and the second plurality of features to a set of training data.

In Example 47, the subject matter of Example 46 optionally includes, further comprising: calculating a parameter using the first plurality of features and the second plurality of features; and displaying the parameter on a display device.

In Example 48, the subject matter of Example 47 optionally includes, wherein the parameter is at least one of an air time, a spin degree, a landing impact, and a max spin speed.

In Example 49, the subject matter of any one or more of Examples 46-48 optionally include, wherein the comparing uses nearest neighbor classification.

In Example 50, the subject matter of any one or more of Examples 37-49 optionally include, further comprising: receiving the first data stream and the second data stream in a training mode; and adding the data used to classify the trick to a set of training data.

In Example 51, the subject matter of any one or more of Examples 37-50 optionally include, wherein the sporting device is a bicycle.

In Example 52, the subject matter of any one or more of Examples 37-51 optionally include, wherein the first free-moving body is a bicycle seat.

In Example 53, the subject matter of any one or more of Examples 37-52 optionally include, wherein the second free-moving body is a bicycle handlebar.

In Example 54, the subject matter of any one or more of Examples 37-53 optionally include, wherein each of the first data stream and the second data stream received at a frequency of 50 Hz.

Example 55 is a system to implement a sensor network for trick classification, the system comprising means to perform any method of Examples 37-54.

Example 56 is a machine readable medium to implement a sensor network for trick classification, the machine readable medium including instructions that, when executed by a machine, cause the machine to perform any method of Examples 37-54.

Example 57 is a system to implement a sensor network for trick classification, the system comprising: means for receiving a first data stream from a first sensor array affixed to a first free-moving body of a sporting device; means for receiving a second data stream from a second sensor array affixed to a second free-moving body of the sporting device; means for identifying, using data from the first data stream, a trick region of a predetermined length of the first data stream corresponding with an occurrence of a trick; and means for classifying the trick using a first set of data from the first data stream corresponding with the trick region and a second set of data from the second data stream, the second set of data obtained by aligning the trick region of the first data stream with the second data stream.

In Example 58, the subject matter of Example 57 optionally includes, further comprising: means for receiving a third data stream from a third sensor array affixed to a user of the sporting device; and wherein the classifying the trick further includes using a third set of data from the third data stream obtained by aligning the trick region of the first data stream with the third data stream.

In Example 59, the subject matter of any one or more of Examples 57-58 optionally include, wherein the first sensor array includes a gyroscope and an accelerometer, and wherein the first data stream includes gyroscope data and accelerometer data.

In Example 60, the subject matter of any one or more of Examples 57-59 optionally include, further comprising: means for determining a rotation magnitude over a period of time; means for calculating an average rotation magnitude and a rotation magnitude standard deviation for the rotation magnitude over the period of time; and wherein the data used in identifying the trick region of the first data stream includes the average rotation magnitude and the rotation magnitude standard deviation.

In Example 61, the subject matter of Example 60 optionally includes, wherein the rotation magnitude is a sum of a square of a first axis rotation magnitude for the period of time, a square of a second axis rotation magnitude for the period of time, and a square of a third axis rotation magnitude for the period of time.

In Example 62, the subject matter of any one or more of Examples 60-61 optionally include, wherein identifying the trick region of the first data stream comprises: means for identifying a start of the trick region corresponding to a first point in the first data stream at which the average rotation magnitude exceeds a threshold; and means for identifying an end of the trick region corresponding to a second point in the first data stream at which the average rotation magnitude exceeds the threshold, the second point being subsequent the first point in the first data stream.

In Example 63, the subject matter of any one or more of Examples 57-62 optionally include, further comprising: means for determining an acceleration magnitude over a period of time; means for calculating an average acceleration magnitude and an acceleration magnitude standard deviation for the acceleration magnitude over the period of time; and wherein the data used in identifying the trick region of the first data stream includes the average acceleration magnitude, and the acceleration magnitude standard deviation.

In Example 64, the subject matter of Example 63 optionally includes, wherein the acceleration magnitude is a sum of a square of a first axis acceleration magnitude for a period of time, a square a second axis acceleration magnitude for the period of time, and a square a third axis acceleration magnitude for the period of time.

In Example 65, the subject matter of any one or more of Examples 63-64 optionally include, wherein identifying the trick region of the first data stream comprises: means for identifying a start of the trick region corresponding to a first point in the data stream during a period of time before the occurrence of the trick at which the average acceleration magnitude exceeds a threshold; and means for identifying an end of the trick region corresponding to a second point in the data stream during a period of time before the occurrence of the trick at which the average acceleration magnitude exceeds the threshold.

In Example 66, the subject matter of any one or more of Examples 57-65 optionally include, further comprising: means for determining a first plurality of features for the first set of data and a second plurality of features for the second set of data; and wherein the classifying the trick includes comparing the first plurality of features and the second plurality of features to a set of training data.

In Example 67, the subject matter of Example 66 optionally includes, further comprising: means for calculating a parameter using the first plurality of features and the second plurality of features; and means for displaying the parameter on a display device.

In Example 68, the subject matter of Example 67 optionally includes, wherein the parameter is at least one of an air time, a spin degree, a landing impact, and a max spin speed.

In Example 69, the subject matter of any one or more of Examples 66-68 optionally include, wherein the comparing uses nearest neighbor classification.

In Example 70, the subject matter of any one or more of Examples 57-69 optionally include, further comprising: means for receiving the first data stream and the second data stream in a training mode; and means for adding the data used to classify the trick to a set of training data.

In Example 71, the subject matter of any one or more of Examples 57-70 optionally include, wherein the sporting device is a bicycle.

In Example 72, the subject matter of any one or more of Examples 57-71 optionally include, wherein the first free-moving body is a bicycle seat.

In Example 73, the subject matter of any one or more of Examples 57-72 optionally include, wherein the second free-moving body is a bicycle handlebar.

In Example 74, the subject matter of any one or more of Examples 57-73 optionally include, wherein each of the first data stream and the second data stream received at a frequency of 50 Hz.

Example 75 is a system to implement a sensor network for trick classification, the system comprising: a processor; a memory; an input receiver module to: receive, at a computing device, a first data stream from a first sensor array affixed to a first free-moving body of a sporting device; and receive a second data stream from a second sensor array affixed to a second free-moving body of the sporting device; a trick region detector module to identify, using data from the first data stream, a trick region of a predetermined length of the first data stream corresponding with an occurrence of a trick; a data synchronizer module to generate a set of trick data, the set of trick data generated by synchronizing the second data stream with the first data stream using the trick region; a feature selector module to select a set of machine learning features from the set of trick data; and a feature comparator module to classify the trick using the set of machine learning features.

In Example 76, the subject matter of Example 75 optionally includes, wherein the input receiver module further to receive a third data stream from a third sensor array affixed to a user of the sporting device, and wherein the trick data generated by the data synchronizer module includes data from the third data stream synchronized with the first data stream and the second data stream using the trick region.

In Example 77, the subject matter of any one or more of Examples 75-76 optionally include, wherein the first sensor array includes a gyroscope and an accelerometer, and wherein the first data stream includes gyroscope data and accelerometer data.

In Example 78, the subject matter of any one or more of Examples 75-77 optionally include, the trick region detector module further to: determine a rotation magnitude over a period of time; calculate an average rotation magnitude and a rotation magnitude standard deviation for the rotation magnitude over the period of time; and wherein the data used in identifying the trick region of the first data stream includes the average rotation magnitude and the rotation magnitude standard deviation.

In Example 79, the subject matter of Example 78 optionally includes, wherein the rotation magnitude is a sum of a square of a first axis rotation magnitude for the period of time, a square of a second axis rotation magnitude for the period of time, and a square of a third axis rotation magnitude for the period of time.

In Example 80, the subject matter of any one or more of Examples 78-79 optionally include, the trick region detector module further to: identify a start of the trick region corresponding to a first point in the first data stream at which the average rotation magnitude exceeds a threshold; and identify an end of the trick region corresponding to a second point in the first data stream at which the average rotation magnitude exceeds the threshold, the second point being subsequent the first point in the first data stream.

In Example 81, the subject matter of any one or more of Examples 75-80 optionally include, the trick region detector module further to: determine an acceleration magnitude over a period of time; calculate an average acceleration magnitude and an acceleration magnitude standard deviation for the acceleration magnitude over the period of time; and wherein the data used to identify the trick region of the first data stream includes the average acceleration magnitude and the acceleration magnitude standard deviation.

In Example 82, the subject matter of Example 81 optionally includes, wherein the acceleration magnitude is a sum of a square of a first axis acceleration magnitude for a period of time, a square a second axis acceleration magnitude for the period of time, and a square a third axis acceleration magnitude for the period of time.

In Example 83, the subject matter of any one or more of Examples 81-82 optionally include, the trick region detector further to: identify a start of the trick region corresponding to a first point in the data stream during a period of time before the occurrence of the trick at which the average acceleration magnitude exceeds a threshold; and identify an end of the trick region corresponding to a second point in the data stream during a period of time before the occurrence of the trick at which the average acceleration magnitude exceeds the threshold.

In Example 84, the subject matter of any one or more of Examples 75-83 optionally include, the feature comparator module further to: compare the set of features to a set of training data to classify the trick.

In Example 85, the subject matter of Example 84 optionally includes, further comprising: the feature comparator module further to calculate a parameter using the set of features; and an output transmitter module to output the parameter on a display device.

In Example 86, the subject matter of Example 85 optionally includes, wherein the parameter is at least one of an air time, a spin degree, a landing impact, and a max spin speed.

In Example 87, the subject matter of any one or more of Examples 84-86 optionally include, wherein the comparing uses nearest neighbor classification.

In Example 88, the subject matter of any one or more of Examples 75-87 optionally include, further comprising: the input receiver module further to receive the first data stream and the second data stream in a training mode; and the feature comparator module further to add the data used to classify the trick to a set of training data.

In Example 89, the subject matter of any one or more of Examples 75-88 optionally include, wherein the sporting device is a bicycle.

In Example 90, the subject matter of any one or more of Examples 75-89 optionally include, wherein the first free-moving body is a bicycle seat.

In Example 91, the subject matter of any one or more of Examples 75-90 optionally include, wherein the second free-moving body is a bicycle handlebar.

In Example 92, the subject matter of any one or more of Examples 75-91 optionally include, wherein each of the first data stream and the second data stream received at a frequency of 50 Hz.

What is claimed is:

1. A computer apparatus to implement a sensor network for trick classification, the computer apparatus comprising:
   a processor; and
   a memory storing instructions that, when executed by the processor, configure the computing apparatus to:
   receive, at a computing device, a first data stream from a first sensor array affixed to a first free-moving body of a sporting device;
   receive a second data stream from a second sensor array affixed to a second free-moving body of the sporting device;
   determine a rotation magnitude over a period of time;
   calculate an average rotation magnitude and a rotation magnitude standard deviation for the rotation magnitude over the period of time;
   identify, using data from the first data stream, a trick region of a predetermined length of the first data stream corresponding with an occurrence of a trick, wherein the data used to identify the trick region of the first data stream includes the average rotation magnitude and the rotation magnitude standard deviation; and
   classify the trick using a first set of data from the first data stream corresponding with the trick region and a second set of data from the second data stream, the second set of data obtained by aligning the trick region of the first data stream with the second data stream.

2. The computer apparatus of claim 1, further comprising instructions, which when executed by the processor, cause the processor to:
   receive a third data stream from a third sensor array affixed to a user of the sporting device; and
   wherein classifying the trick uses a third set of data from the third data stream obtained by aligning the trick region of the first data stream with the third data stream.

3. The computer apparatus of claim 1, wherein the rotation magnitude is a sum of a square of a first axis rotation magnitude for the period of time, a square of a second axis rotation magnitude for the period of time, and a square of a third axis rotation magnitude for the period of time.

4. The computer apparatus of claim 1, wherein the instructions to identify the trick region of the first data stream comprises instructions, which when executed by the processor, cause the processor to:
   identify a start of the trick region corresponding to a first point in the first data stream at which the average rotation magnitude exceeds a threshold; and
   identify an end of the trick region corresponding to a second point in the first data stream at which the average rotation magnitude exceeds the threshold, the second point being subsequent the first point in the first data stream.

5. The computer apparatus of claim 1, further comprising instructions, which when executed by the processor, cause the processor to:
   determine an acceleration magnitude over a period of time;
   calculate an average acceleration magnitude and an acceleration magnitude standard deviation for the acceleration magnitude over the period of time; and
   wherein the data used to identify the trick region of the first data stream includes the average acceleration magnitude and the acceleration magnitude standard deviation.

6. The computer apparatus of claim 5, wherein the acceleration magnitude is a sum of a square of a first axis acceleration magnitude for a period of time, a square a second axis acceleration magnitude for the period of time, and a square a third axis acceleration magnitude for the period of time.

7. The computer apparatus of claim 1, further comprising instructions, which when executed by the processor, cause the processor to:
   determine a first plurality of features for the first set of data and a second plurality of features for the second set of data; and
   wherein to classify the trick includes comparing the first plurality of features and the second plurality of features to a set of training data.

8. A computer-readable storage medium to implement a sensor network for trick classification, the computer-readable storage medium including instructions that when executed by a computer, cause the computer to:
   receive, at a computing device, a first data stream from a first sensor array affixed to a first free-moving body of a sporting device;
   receive a second data stream from a second sensor array affixed to a second free-moving body of the sporting device;
   determine a rotation magnitude over a period of time;
   calculate an average rotation magnitude and a rotation magnitude standard deviation for the rotation magnitude over the period of time;
   identify, using data from the first data stream, a trick region of a predetermined length of the first data stream corresponding with an occurrence of a trick, wherein the data used to identify the trick region of the first data stream includes the average rotation magnitude and the rotation magnitude standard deviation; and
   classify the trick using a first set of data from the first data stream corresponding with the trick region and a second set of data from the second data stream, the second set of data obtained by aligning the trick region of the first data stream with the second data stream.

9. The computer-readable storage medium of claim 8, further comprising instructions that when executed by a computer, cause the computer to:
   receive a third data stream from a third sensor array affixed to a user of the sporting device; and
   wherein the instructions to classify the trick further includes instructions to use a third set of data from the third data stream obtained by aligning the trick region of the first data stream with the third data stream.

10. The computer-readable storage medium of claim 8, wherein the rotation magnitude is a sum of a square of a first axis rotation magnitude for the period of time, a square of a second axis rotation magnitude for the period of time, and a square of a third axis rotation magnitude for the period of time.

11. The computer-readable storage medium of claim 8, wherein the instructions to identify the trick region of the first data stream comprises instructions that when executed by a computer, cause the computer to:
   identify a start of the trick region corresponding to a first point in the first data stream at which the average rotation magnitude exceeds a threshold; and
   identify an end of the trick region corresponding to a second point in the first data stream at which the average rotation magnitude exceeds the threshold, the second point being subsequent the first point in the first data stream.

12. The computer-readable storage medium of claim 8, further comprising instructions that when executed by a computer, cause the computer to:
   determine an acceleration magnitude over a period of time;
   calculate an average acceleration magnitude and an acceleration magnitude standard deviation for the acceleration magnitude over the period of time; and
   wherein the data used in identifying the trick region of the first data stream includes the average acceleration magnitude, and the acceleration magnitude standard deviation.

13. The computer-readable storage medium of claim 12, wherein the acceleration magnitude is a sum of a square of a first axis acceleration magnitude for a period of time, a square a second axis acceleration magnitude for the period of time, and a square a third axis acceleration magnitude for the period of time.

14. The computer-readable storage medium of claim 8, further comprising instructions that when executed by a computer, cause the computer to:
   determine a first plurality of features for the first set of data and a second plurality of features for the second set of data; and
   wherein the instructions to classify the trick includes instructions that when executed by a computer, cause the computer to compare the first plurality of features and the second plurality of features to a set of training data.

15. A method to implement a sensor network for trick classification, the method comprising:
   receiving, at a computing device, a first data stream from a first sensor array affixed to a first free-moving body of a sporting device;
   receiving a second data stream from a second sensor array affixed to a second free-moving body of the sporting device;
   determining a rotation magnitude over a period of time;
   calculating an average rotation magnitude and a rotation magnitude standard deviation for the rotation magnitude over the period of time;
   identifying, using data from the first data stream, a trick region of a predetermined length of the first data stream corresponding with an occurrence of a trick, wherein the data used in identifying the trick region of the first data stream includes the average rotation magnitude and the rotation magnitude standard deviation; and
   classifying the trick using a first set of data from the first data stream corresponding with the trick region and a second set of data from the second data stream, the second set of data obtained by aligning the trick region of the first data stream with the second data stream.

16. The method of claim 15, further comprising:
   receiving a third data stream from a third sensor array affixed to a user of the sporting device; and
   wherein the classifying the trick further includes using a third set of data from the third data stream obtained by aligning the trick region of the first data stream with the third data stream.

17. The method of claim 15, wherein the rotation magnitude is a sum of a square of a first axis rotation magnitude for the period of time, a square of a second axis rotation magnitude for the period of time, and a square of a third axis rotation magnitude for the period of time.

18. The method of claim 15, wherein identifying the trick region of the first data stream comprises:
   identifying a start of the trick region corresponding to a first point in the first data stream at which the average rotation magnitude exceeds a threshold; and
   identifying an end of the trick region corresponding to a second point in the first data stream at which the average rotation magnitude exceeds the threshold, the second point being subsequent the first point in the first data stream.

19. The method of claim 15, further comprising:
   determining an acceleration magnitude over a period of time;
   calculating an average acceleration magnitude and an acceleration magnitude standard deviation for the acceleration magnitude over the period of time; and
   wherein the data used in identifying the trick region of the first data stream includes the average acceleration magnitude, and the acceleration magnitude standard deviation.

20. The method of claim 19, wherein the acceleration magnitude is a sum of a square of a first axis acceleration magnitude for a period of time, a square a second axis acceleration magnitude for the period of time, and a square a third axis acceleration magnitude for the period of time.

21. The method of claim 15, further comprising:
   determining a first plurality of features for the first set of data and a second plurality of features for the second set of data; and
   wherein the classifying the trick includes comparing the first plurality of features and the second plurality of features to a set of training data.

* * * * *